US008360364B2

(12) United States Patent
Guering et al.

(10) Patent No.: US 8,360,364 B2
(45) Date of Patent: Jan. 29, 2013

(54) AIRCRAFT COMPRISING A PLATFORM THAT CAN BE MOVED BETWEEN TWO LEVELS OF THE AIRCRAFT

(75) Inventors: Bernard Guering, Montrabe (FR); Jonathan Guering, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 524 days.

(21) Appl. No.: 12/664,473

(22) PCT Filed: Jun. 12, 2008

(86) PCT No.: PCT/FR2008/051047
§ 371 (c)(1), (2), (4) Date: Dec. 14, 2009

(87) PCT Pub. No.: WO2009/004218
PCT Pub. Date: Jan. 8, 2009

(65) Prior Publication Data
US 2010/0187356 A1 Jul. 29, 2010

(30) Foreign Application Priority Data
Jun. 15, 2007 (FR) ...................................... 07 04308

(51) Int. Cl.
*B64D 11/00* (2006.01)

(52) U.S. Cl. .................................. 244/118.5; 244/118.1
(58) Field of Classification Search .............. 244/117 R, 244/118.1, 118.5, 137.2
See application file for complete search history.

(56) References Cited

U.S. PATENT DOCUMENTS

| 4,653,707 | A | 3/1987 | Hamilton et al. |
| 7,318,566 | B2 * | 1/2008 | Hubenthal et al. ......... 244/137.2 |
| 2002/0148928 | A1 | 10/2002 | Oki |
| 2009/0159743 | A1 | 6/2009 | Guering et al. |

FOREIGN PATENT DOCUMENTS

| EP | 1 211 174 | 6/2002 |
| EP | 1 538 121 | 6/2005 |

* cited by examiner

*Primary Examiner* — Rob Swiatek
(74) *Attorney, Agent, or Firm* — Oblon, Spivak, McClelland, Maier & Neustadt, L.L.P.

(57) ABSTRACT

An aircraft with at least two levels situated one above the other, including: a platform that can be moved between a first position and a second position, the first of these positions, as a lower position, being situated at a first level of the aircraft and the second position, as a higher position, being situated at a second level higher than that of the first level; an assembly of traction cables connected on the platform and a mechanism operating the cables for raising and lowering the platform; and an assembly of walls surrounding at least partially the platform and along which the platform moves.

21 Claims, 9 Drawing Sheets

AIRCRAFT COMPRISING A PLATFORM THAT CAN BE MOVED BETWEEN TWO LEVELS OF THE AIRCRAFT

The invention relates to an aircraft.

Commercial aircraft often have several decks or levels distributed vertically and among which the on-board personnel and the passengers must be able to circulate.

For example, certain large carriers of the Airbus A380 type comprise a double deck for the passengers and the latter circulate from one deck to the other by using stairs.

It might prove to be useful, however, for the on-board personnel to go from one deck to the other without disturbing the passengers.

Furthermore, in the front portion of the aircraft the pilots and the copilots present in the cockpit need to go to a level lower than that of the cockpit, for example to rest in the space provided for this purpose or to access the hold, referred to as avionic hold, in which the various computers and avionic systems of the aircraft are stored.

Until now, the pilots and copilots wishing to go from the cockpit to the lower locale or vice versa have been using a ladder that emerges, at the cockpit, into an aisle connecting the cockpit to a door separating the said cockpit from the rest of the aircraft.

This solution proves to be relatively satisfactory considering the limited space available for getting from one level to another.

The use of a ladder, however, can prove to be dangerous for the personnel, for example in case of turbulence or at night, and not very user-friendly.

Moreover, the moving of heavy loads proves to be difficult with a ladder.

Furthermore, it might be advantageous to reduce the space requirement resulting from the slant of a ladder.

This invention seeks to remedy at least one of the drawbacks of the prior art by proposing:
- a platform that can be moved vertically between a first position and a second position, the first of these positions, referred to as high, being situated at a first level of the aircraft and the second position, referred to as low, being situated in a locale situated at a second level lower than that of the first level,
- a series of traction cables connected on the one hand to the platform and on the other hand to means for driving the said cables for raising and lowering the platform,
- a series of walls at least partially surrounding the platform and along which the platform moves.

This platform thus serves as an elevator between the two levels, which facilitates and improves access between the levels.

The platform offers a relatively small space requirement and therefore can be installed in cramped spaces, in particular between the cockpit and a lower locale (avionic hold, rest module . . . ) situated at the first level.

It will be noted that, in such a case, a series of fixed walls at least partially surround the platform (for example the walls of the aisle leading from the door to the interior of the cockpit and walls of the lower locale) and constitute the natural environment of the platform, at the lower level as well as at the upper level. These walls in fact form part of the interior layout of the aircraft (environment) and form, in a way, a natural elevator shaft.

The platform therefore is not fastened to the walls that surround it.

Thus, by using the walls constituting the natural environment of the platform, the weight taken on board the aircraft is minimized.

The use of the natural environment of the platform at the two levels moreover facilitates installation of the elevator platform.

According to one characteristic, the platform comprises a series of guide mechanisms distributed at its periphery and which cooperate with walls along which the platform moves vertically, that is, perpendicular to the floor of one of the levels.

These mechanisms, such as rollers, make it possible to easily guide the raising and lowering movements of the platform.

According to one characteristic, the aircraft comprises a floor at the level of which there are located the platform in its second high position and means for adjusting the parallelism of the platform in relation to the floor.

In this way, a possible lack of parallelism (horizontality) of the platform can be compensated for by acting appropriately on the traction cables.

According to one characteristic, the adjusting means comprise one or more sensors detecting the position of one or more parts of the platform (for example, in relation to a reference point that is parallel to the floor) and issuing a corresponding information item in order accordingly to activate or not activate the drive means of the corresponding cable or cables.

This sensor or these sensors is/are connected directly or indirectly to the drive means for the series of cables in order to control the activation of these means, and thus the setting in motion of the cables, when the sensor or sensors has/have detected that the platform is leaning to one side.

According to one characteristic, the series of traction cables goes through a system of upper pulleys arranged at the second level, for example that of the cockpit, and through a system of lower pulleys arranged at the first level, for example that of a locale such as a rest module or an avionic hold.

The function of the pulleys is to properly orient the cables in relation to the vertical movement of the platform.

According to one characteristic, the series of upper pulleys comprises four pulleys each arranged next to one of the four angles of the platform when the latter is in its second position, the series of lower pulleys comprising four pulleys arranged respectively at the base of the four upper pulleys.

According to one characteristic, the aircraft comprises at least two cable winder/unwinder systems with two independent oriented paths, each path allowing for two traction cables.

According to one characteristic, at least one of the two cable winder/unwinder systems possesses paths having several possible geometric orientations for the cables exiting from the system.

According to one characteristic, the aircraft comprises an aisle extending from the cockpit up to door providing access to the rest of the aircraft, the platform in its second high position emerging at the aisle.

In this high position, the door can be opened without risk of accident for the personnel.

It will be noted that the possibility of opening the door can be subjugated to the position of the platform in order to allow opening only when the platform is in high position.

Other characteristics and advantages will become apparent in the course of the description that is going to follow, provided solely by way of non-limitative example and presented with reference to the attached drawings, on which:

FIG. 6 is an enlarged view of a cable winder/unwinder system illustrated on FIG. 5a;

FIG. 8 is a schematic view in perspective showing the setting up in situ of a part of the mechanism illustrated on FIG. 5a;

Figure 1:
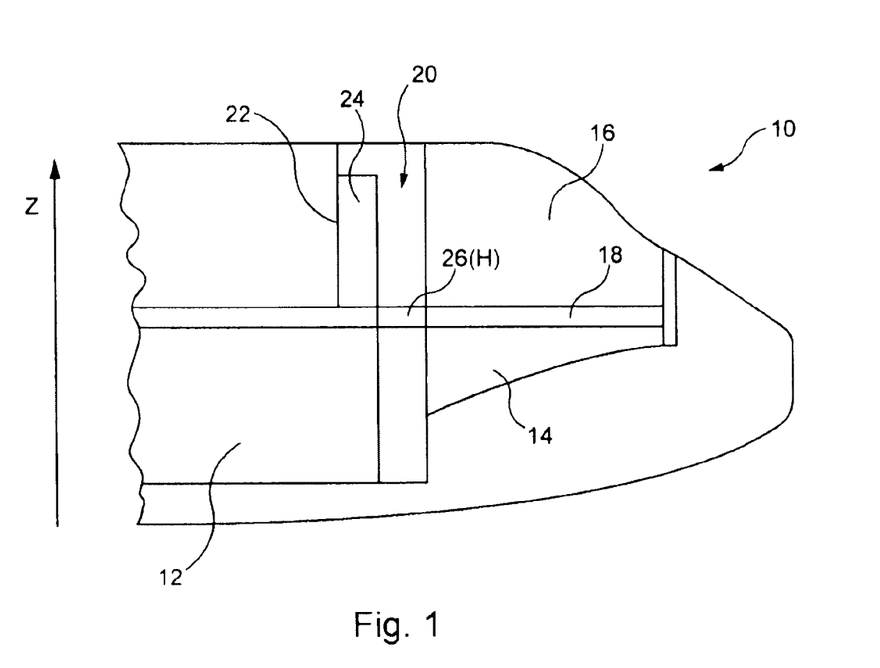
FIG. 1 is a general schematic view showing several levels of an aircraft along a longitudinal section thereof.

As shown on FIG. 1 and designated by the general reference marked 10, an aircraft comprises several levels, also called decks, and for example, two levels arranged vertically one above the other.

At the first level there is a locale 12 which is, for example, a hold commonly called avionic hold, in which there are installed the various computers and avionic systems used on board the aircraft, but not shown on this Figure.

Another space 14 positioned more toward the front of the aircraft contains, for example, avionic equipment items such as computers.

The aircraft comprises at the upper level, in the portion situated at the front end of the aircraft, cockpit 16 which is located, in the exemplary embodiment, above space 14 and separated from the latter by a horizontal wall 18 forming a floor.

This floor separates the two levels of the aircraft from one another.

Behind cockpit 16 is an aisle 20 leading to a door 22 that separates the cockpit from the rest of the aircraft and in particular from the passenger cabin.

Another door 24 also opens into this aisle and provides access, for example, to lavatories for the crew.

This door is arranged perpendicular to entrance door 22 and is arranged by the side of the end of the aisle that opens into the cockpit.

A platform or plateau 26 arranged in alignment with floor 18 also has been shown schematically on this Figure.

Figure 2:
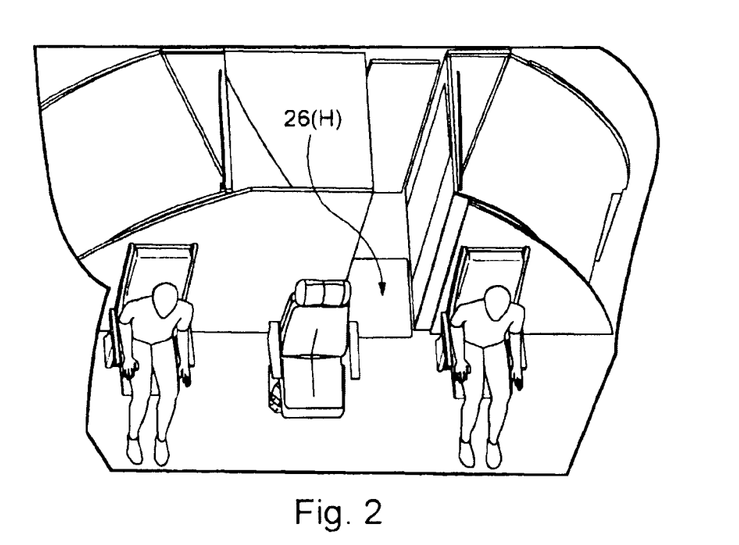
FIG. 2 is a schematic view in perspective showing the setting up of the platform according to the invention in high position, according to one embodiment.

This platform, in its position shown on FIGS. 1 and 2, is situated in aisle 20 between door 22 and cockpit 16 and in a way constitutes a part of the floor.

Figure 3:
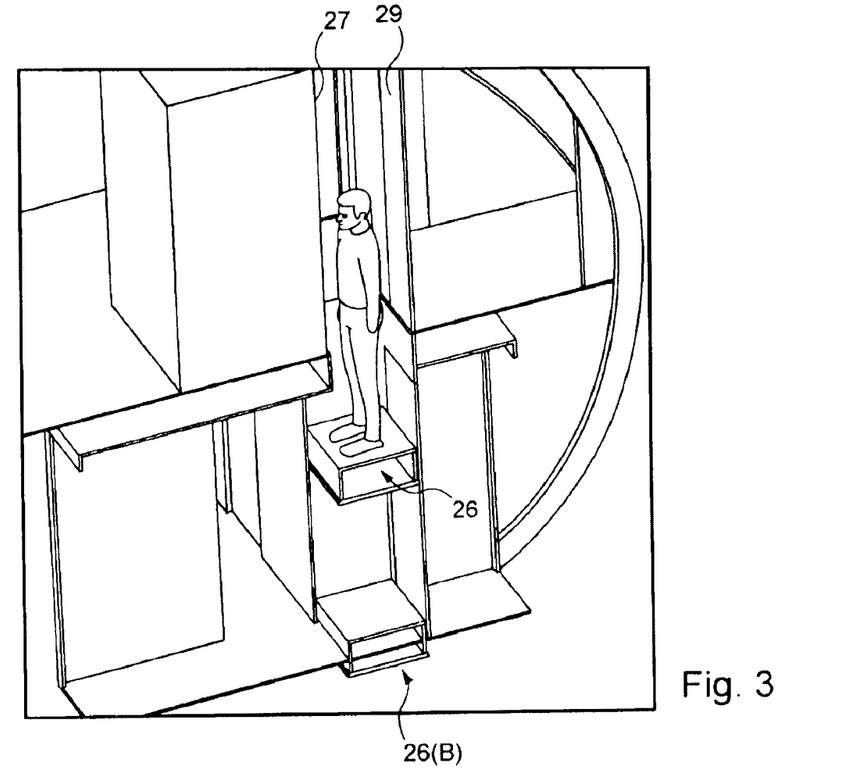
FIG. 3 is a general schematic view in perspective of the platform that can be moved between the two levels of FIG. 1.

This platform, however, can be moved vertically along the axis Z between two extreme positions: a low position situated at the first level of the aircraft, as shown at the bottom of FIG. 3, and a high position situated at the second level of the aircraft, as shown on FIGS. 1 and 2.

In the remainder of the exposition, the low position of FIG. 3 will be shown with the letter B and the high position of FIGS. 1 and 2 with the letter H.

On FIG. 3 platform 26 also has been shown in an intermediate position between these two extreme positions with an individual supported by this platform in motion.

Figure 4:
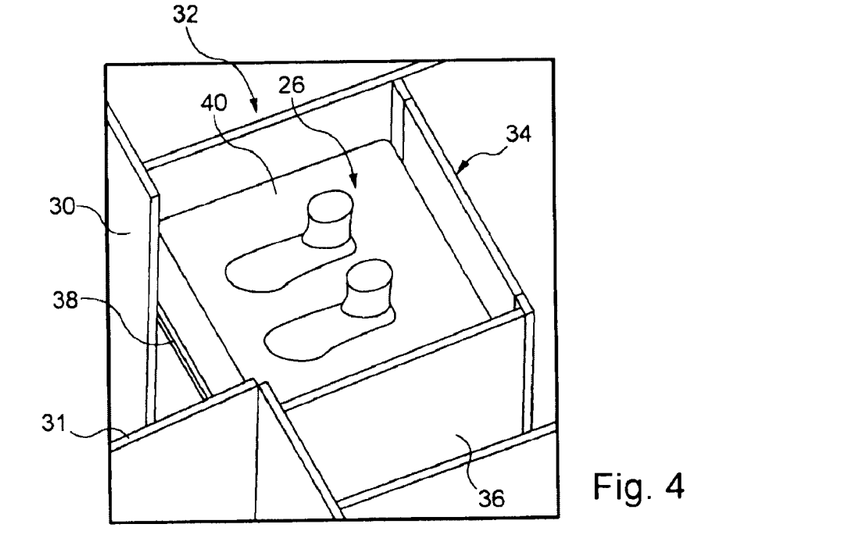
FIG. 4 is an enlarged partial schematic view of the platform shown on FIG. 3 and of its environment.

As shown on FIG. 4, platform 26 of FIG. 3 is shown in its use environment, that is, accommodated between several fixed walls that surround it and not integral with the latter. The space between these walls and the platform is sufficient to ensure the mobility of the latter and not too large in order to guarantee adequate safety for the users.

This series of walls attached to the internal structure of the aircraft in a way forms a natural elevator shaft for the platform during its movement between the low and high positions. It therefore is not necessary to recreate an elevator shaft by adding walls around the platform, which obviates an additional weight.

It thus is noted that platform 26 is surrounded on three sides and the fourth side is left open over at least one portion in order to constitute an opening allowing access to the elevator or exit therefrom when the platform is located in low position (position 26(B) on FIG. 3).

Vertical opening 30 visible on FIGS. 3 and 4 has approximately the measurements of an adult individual in height and width.

This opening can be closed off with a door 31 (FIG. 4) in order to improve safety of use of the platform.

More particularly, when the platform is in high position (position 26(H) on FIGS. 1 and 2), that is, at the level of floor 18, the opposite walls facing each other delimiting the aisle define the elevator shaft (walls 27 and 29 on FIG. 3).

Below this position (intermediate and low positions of FIG. 3), platform 26 is surrounded by a wall 32, a wall 34 and a wall 36 behind which avionic equipment items are arranged, the two walls 32 and 36 being opposite one another and wall 34, perpendicular to the other two, being opposite longitudinal opening 30 and door 31 when the latter is closed.

More particularly, platform 26 comprises a plateau forming base 38 and a step or box 40 positioned in fixed manner on the plateau on which the individual wishing to use the platform to go from one level to the other stands.

The step has dimensions slightly smaller than those of the plateau, this in order to allow the passage of cables in the thickness of the plateau as will be seen afterwards.

It will be noted that platform 26 has been shown with a rectangular section but could, however, assume other forms, such as a square, round . . . form.

It furthermore will be noted that under certain circumstances, the form or more specifically the outer contour, of the platform is adapted to the surrounding space in order to best fit into the latter.

The platform according to the invention can be accommodated easily in a limited space, at a place in an aircraft where space is lacking, insofar as it offers a reduced space requirement.

Figure 5A:
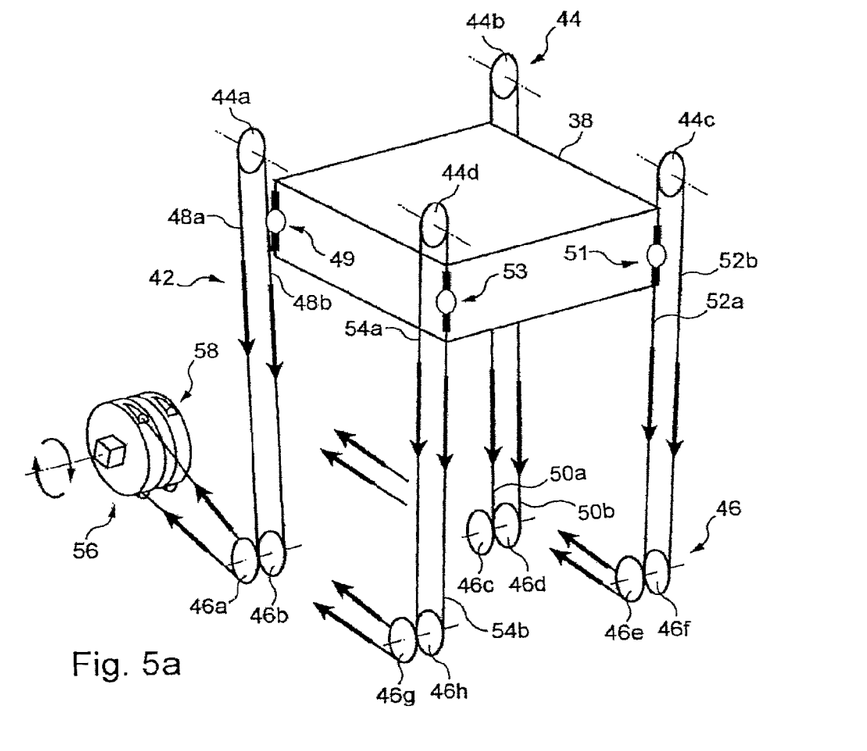
FIG. 5a is a general schematic view of the mechanism for movement of the platform.

Furthermore, the platform is able to move vertically by virtue of the raising and lowering mechanism shown very schematically on FIG. 5a.

As shown on this Figure, the mechanism comprises a series of traction cables 42 that are connected to platform 26 and, more specifically, to plateau 38 (step 40 is not shown on FIG. 5a).

The series of cables 42 is associated with drive means that, when they are activated, are capable of exerting a traction on the cables in one direction or in another in order to bring about the raising or lowering of the platform according to the operation selected by the user of the platform A control box, not shown on the Figures, is provided at each level to activate the raising or lowering of the platform.

It also is conceivable to control the movement with a remote control or via a control accessible to the pilots seated on their seats.

More particularly, the mechanism for setting the platform in motion comprises several pulleys mounted in rotation on two horizontal axes, as shown schematically on FIG. 5a, and each able to turn around the axis of rotation thereof.

The various cables of series 42 each are mounted on a set of upper and lower pulleys, while being kept integral with plateau 38 over a portion of their length, for example, by a cable-clamp system.

Figure 5B:
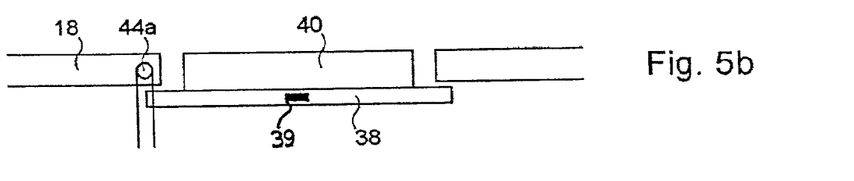
FIG. 5b is a partial schematic view showing the setting up of an upper pulley at the level of the floor.

For example, a system of upper pulleys 44 is provided at the second level, for example at the level of floor 18 as shown on FIG. 5b.

As regards a second series of lower pulleys 46, it is installed at the first level.

As shown on FIG. 5a, the series of pulleys 44 comprises four pulleys each mounted near one of the four angles of the plateau and arranged in floor 18 as illustrated schematically on FIG. 5b.

Figure 5C:
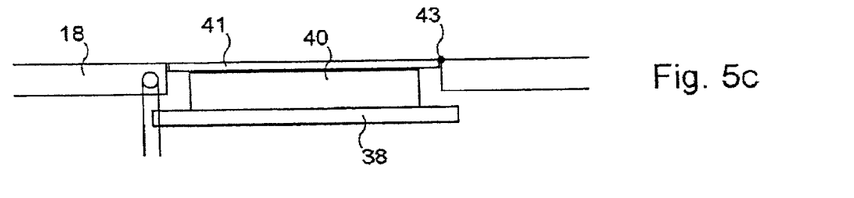
FIG. 5c is an embodiment variant of FIG. 5b.

FIG. 5c schematically illustrates an embodiment variant in which an access hatch 41 covers the platform when the latter is in high position, particularly for safety reasons.

This hatch is articulated, for its opening and its closing, by a connection forming a hinge 43 which is secured to floor 18.

Two cables are wound around each of these pulleys as shown on FIGS. 5a and 5b.

Two respective ends of each pair of cables are made integral with one another by the aforementioned cable-clamp system in the thickness of plateau 38.

More precisely, eight cables 48a, 48b, 50a, 50b, 52a, 52b, 54a, 54b attached two by two are wound respectively around four upper pulleys 44a, 44b, 44c, 44d.

Clamping systems 49, 51, 53 serve respectively to keep the ends of pairs 48a, 48b, 52a, 52b and 54a, 54b fixed in relation to each other, the clamping system for the ends of cables 50a, 50b not being visible on this Figure.

The series of lower pulleys 46 comprises four pairs of pulleys 46a and 46b, 46c and 46d, 46e and 46f, 46g and 46h, each pair being arranged at the base of an upper pulley and the two pulleys of each pair each accommodating one of the two cables winding on the upper pulley.

In this way, cables 48a and 48b wind around pulley 44a and respectively wind around pulleys 46a and 46b of a first pair.

Cables 50a and 50b wind around upper pulley 44b and respectively wind around lower pulleys 46c and 46d of a second pair.

Cables 52a and 52b wind around upper pulley 44c and respectively wind around lower pulleys 46e and 46f of a third pair.

Cables 54a and 54b wind around upper pulley 44d and respectively wind around two lower pulleys 46g and 46h of a fourth pair.

The two free ends of the two cables going through the lower pulleys are associated with a cable winder/unwinder mechanism such as the one marked 56 on FIG. 5a.

On this Figure, cables 48a and 48b are connected to winder/unwinder mechanism 56, while cables 54a and 54b are connected to winder/unwinder mechanism 58 adjacent to mechanism 56.

Likewise, cables 50a, 50b and 52a, 52b are connected respectively to two adjacent winder/unwinder mechanisms not shown on this Figure.

Considering the number of traction cables, four winder/unwinder mechanisms are used.

Figure 6:
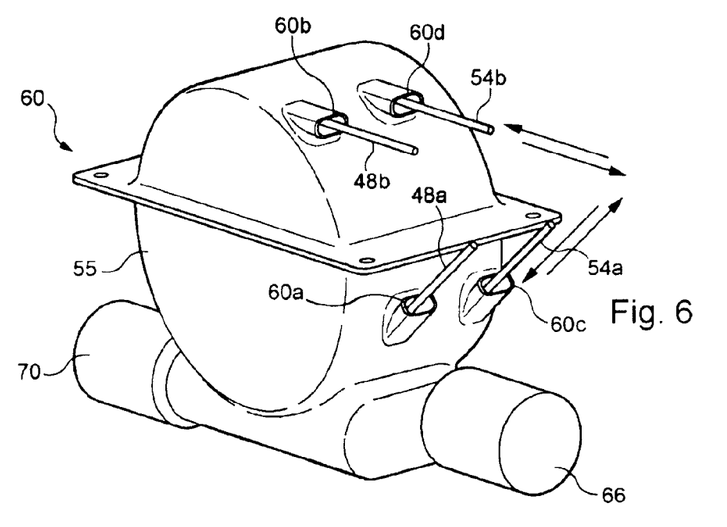

FIG. 6 illustrates a cable winder/unwinder system 60 with two independently oriented paths containing, inside a protective casing 55, two winder/unwinder mechanisms such as mechanisms 56 and 58 of FIG. 5a.

Each path is associated with one of four angles of plateau 38 and allows for two cables.

This system 60 thus accommodates, for example, on one of its two neighboring paths, the free ends of two cables 48a and 48b and, on the other path, the free ends of cables 54a and 54b.

To accomplish this, four openings or holes 60a, 60b, 60c, 60d are implemented respectively in box 55 in order to allow passage of respective cables 48a, 48b, 54a, 54b.

It will be noted that these holes orient the exit of each of the cables in fixed manner by virtue of appendages or conduits that extend from the casing, over a short distance, in order to guide the cable and impart thereto a given geometric orientation.

To give more flexibility to the system, it is conceivable, however, to have guide slots or arcs along an angular sector in order to orient each cable according to a plurality of possible geometric orientations. In addition, a mechanism for guiding the cable in the slot and a protective guard (anti-dust . . . ) are provided at the slot.

Figure 7A:
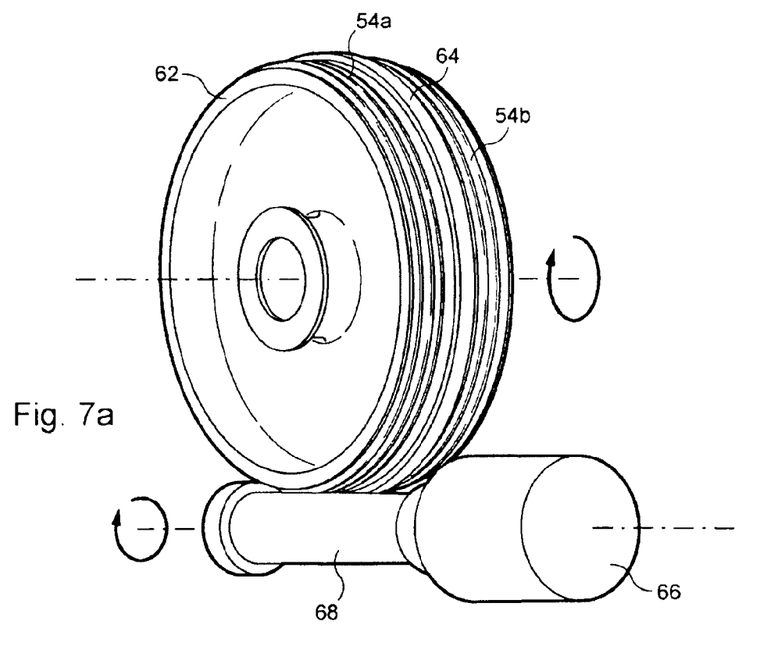
FIG. 7a is a partial schematic view of the winder/unwinder of FIG. 6 without its protective casing.

FIG. 7a shows one of the winder/unwinder mechanisms (one path) without the protective casing of FIG. 6.

The cables are wound on a rotary support 62 comprising a central shoulder 64 and a motor 66 (a part of which is visible on FIG. 6) and connected at its exit to a worm screw 68 that cooperates with central shoulder 64 of rotary support 62. As the arrows on FIG. 7a indicate, this makes it possible to drive rotary support 62 in rotation around its horizontal axis of rotation which is arranged perpendicular to the horizontal axis of rotation of motor 66.

It will be noted that the rotary support comprises, more specifically, on both sides of central shoulder 64, two tracks on each of which there is provided a ring-shaped helical groove. The free end of each of the two cables (for example 54a and 54b on FIG. 7a) cooperating with the winder/unwinder mechanism is wound on one of the two tracks.

Depending on the direction of rotation of the motor, the rotary support turns in one or the other direction and thus makes it possible to exert a traction on one or the other of the cables in order to wind it on one of the tracks, while the other cable on the other track unwinds by the same length while being relatively taut. In this way, the winding/unwinding of these cables brings about the raising or lowering of plateau 38.

The directions of traction exerted on the cables are illustrated by the double arrows on FIG. 6.

System 60 comprises two motors: motor 66 shown on FIG. 7 and another motor 70 intended to drive in rotation a support identical to the one shown on FIG. 7, so as to drive cables 54a and 54b in movement.

Figure 7B:
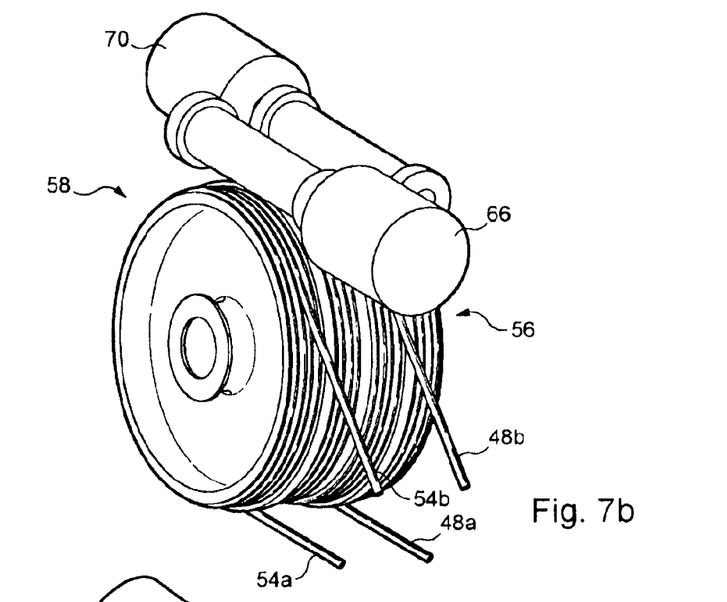
FIG. 7b shows the arrangement of the motors and of the rotating hubs of the system of FIG. 6 without the protective hood.

FIG. 7b shows the two mechanisms 56 and 58 placed side by side without casing 55 and in turned-around position (the motors are situated above in relation to FIG. 6).

On this Figure, cables 54a, 54b and 48a, 48b are wound respectively on the four tracks of the two mechanisms 56 and 58.

In this way device 60 forms one single module which is capable of driving four distinct traction cables in movement, while offering a reduced space requirement.

This compact system in fact is preferable, in the exemplary embodiment described, to four distinct winder/unwinder mechanisms which each would be positioned near one of the pairs of lower pulleys.

This electromechanical system offers not only a saving in volume and therefore space requirement, but also makes it possible to simplify the installation of a movable platform on board an aircraft.

FIGS. 7c to 7i illustrate an embodiment variant of the preceding cable winder/unwinder system.

System 60 of FIGS. 6, 7a and 7b is designed so that the protective casing imparts an exit geometry to the cables by orienting the latter in fixed manner (with appendages in the form of guide conduits) or variable manner (the exit orientation of the cables is adjusted, for example, with an angularly adjustable slot or with an exit angular sector.)

Unlike the preceding, system 80 of FIGS. 7c to 7i differs from system 60, in particular by the integration at the exit of two diametrically opposite ramps for pulleys 82, 84 which are mounted free in rotation around two respective horizontal cylindrical shafts 86, 88.

Figure 7C:
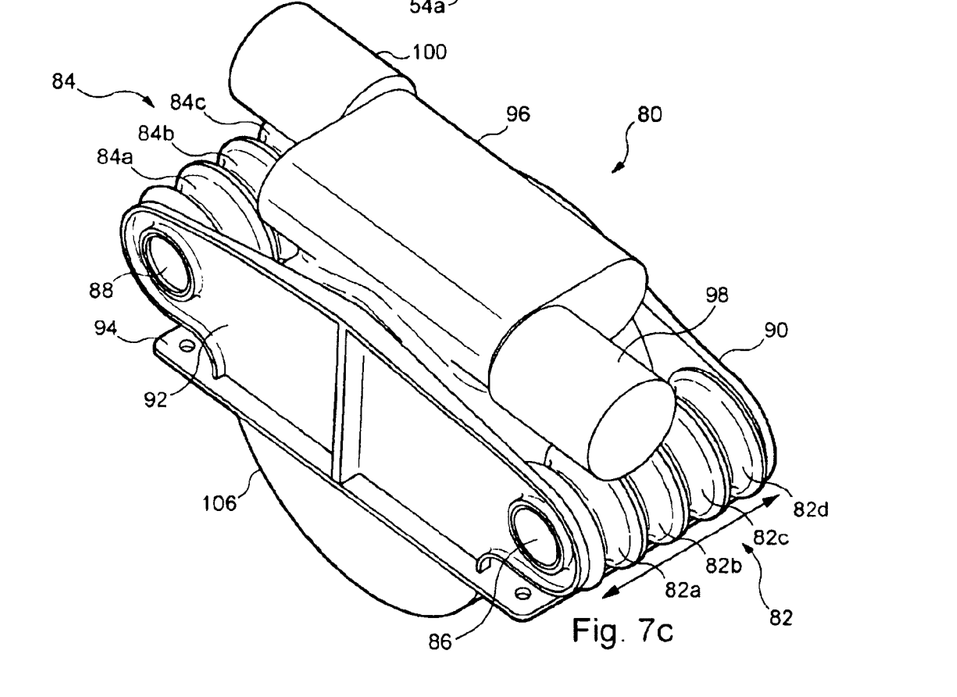
FIGS. 7c and 7d are respective views in perspective of the exterior and of the interior of another cable winder/unwinder system.

Two longitudinal cheeks 90, 92 are fixed perpendicular to a plate 94 forming a fastening base for the system and serve as supports surrounding the two shafts 86, 88 in fixed manner.

A motor unit 96 forming a protective casing for the two motors 98, 100 and for the drive mechanism for rotary hubs 102 and 104 with two tracks is shown on the bottom of system 80. The arrangement of the motors and rotary hubs forming the winding and unwinding tracks for the cables is the same as the one of FIG. 7b (the motors and the hubs are identical).

A protective housing 106 in the form of a demi-cylinder is arranged beneath the base 94.

Figure 7D:
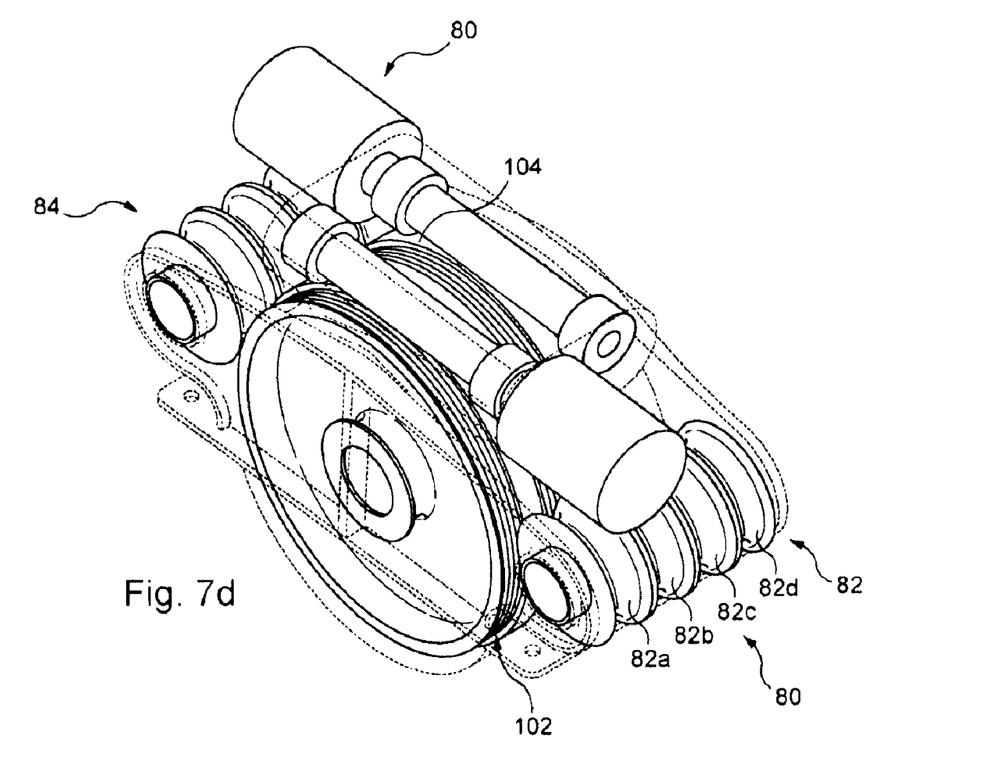

FIG. 7d shows the inside of the protective box containing system 80 with the two adjacent rotary hubs 102, 104 and the two ramps for pulleys 82, 84 aligned with the hubs so as to accommodate, in the axis, the cables wound in the grooves of the tracks.

Each ramp for pulleys 82 and 84 comprises four grooves of large width 82a, 82b, 82c, 82d and 84a, 84b, 84c, 84d, each arranged in alignment with one of the two tracks of each hub 102, 104.

The large width of the grooves makes it possible to adapt to the slight lateral movements of the cables which can occur during the winding/unwinding thereof in relation to the helical grooves of the hubs.

In this way a stressing of the cables is avoided.

The function of pulleys 82, 84 is to achieve for system 80, in simple manner, without considerably increasing the space requirement thereof, a great flexibility of use in the choice of possible orientations of the cables and to offer a maximum range of possible orientations.

The plurality of pulleys 82, 84 exiting from the protective box for the system makes it possible to pre-orient the cables right from their exit.

The cables thus wind partially around the corresponding grooves of the pulleys over a length (arc of a circle) which depends on the desired angular orientation.

FIGS. 7e-i schematically illustrate the various ranges of possible orientations for the cables exiting from the protective box according to the tracks used on hubs 102, 104.

Figure 7E:
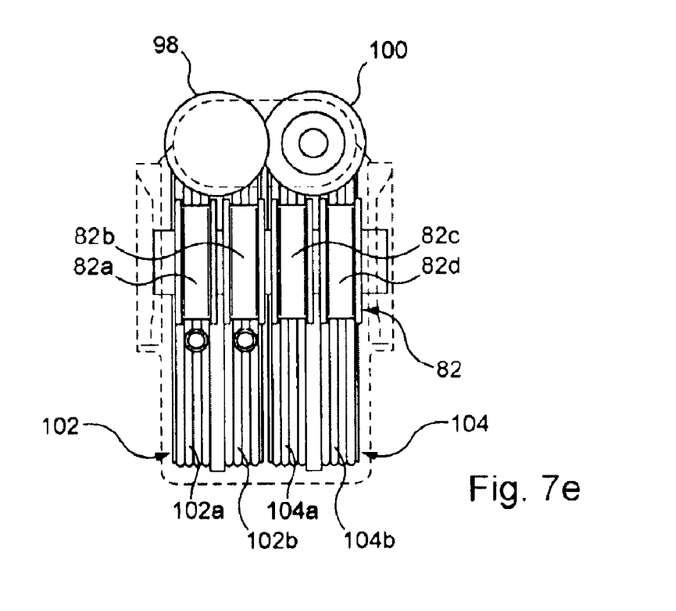
FIG. 7e illustrates the different paths of the system of FIGS. 7c and 7d.

FIG. 7e schematically shows, in a side view (in the axis of alignment of the ramps for pulley 82, 84 and of hubs 102, 104) the four tracks 102a, 102b and 104a, 104b of the two hubs.

Figures 7F, 7G:
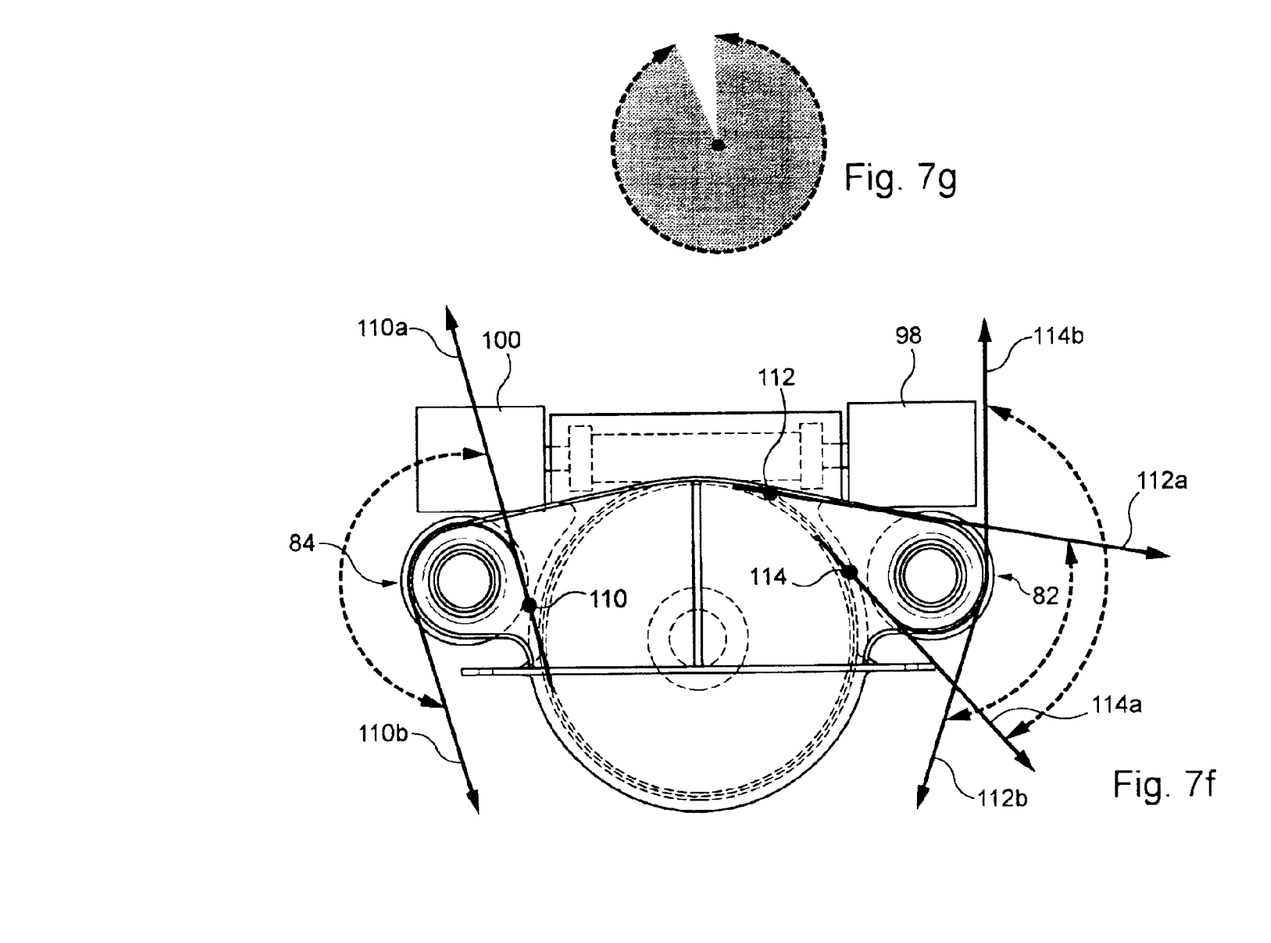
FIGS. 7f and 7g respectively show the various possible angular orientations for the cables exiting from track 102a of the system of FIGS. 7c-e, and the total angular range resulting therefrom.

FIG. 7f illustrates three possible exit locations for the cable wound on track 102a of hub 102, materialized by points 110, 112 and 114.

These three locations are implemented in the form of simple openings made in the protective box (unlike the exit conduits in the form of ears guiding the cables on FIG. 6).

In this way, by the opening 110 the cable can be oriented according to the angular range defined by the two arrows 110a and 110b.

Likewise, the two other exit points 112 and 114 for the cable make it possible to orient the cable over an angular range defined respectively by arrows 112a, 112b, on the one hand, and 114a, 114b, on the other hand.

FIG. 7g shows in space the range of possible geometric orientations resulting from the addition of the various angular sectors materialized on FIG. 7f.

It will be noted that the possibilities for spatial orientation of the cable that is positioned on track 104a are symmetrical with those of FIG. 7f in relation to the vertical.

Figure 7H:
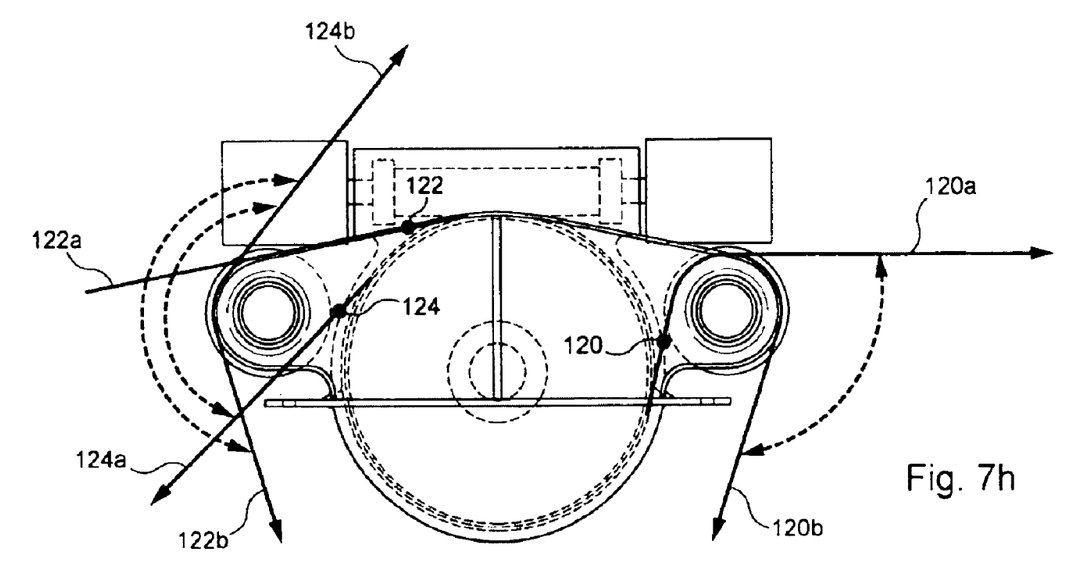
FIGS. 7h and 7i respectively show the different possible angular orientations for the cables exiting from track 102b of the system of FIGS. 7c-e, and the total angular range resulting therefrom.

FIG. 7h shows three possible exit locations for the cable wound on track 102b of hub 102, materialized by points 120, 122 and 124.

These three locations also are implemented in the form of simple openings in the protective box of the system, just as for locations 110, 112 and 114 of FIG. 7f.

The various angular sectors for possible orientation of the cable through each opening 120, 122, 124 are defined respectively by the pairs of arrows 120a and 120b, 122a and 122b, 124a and 124b.

Figure 7I:
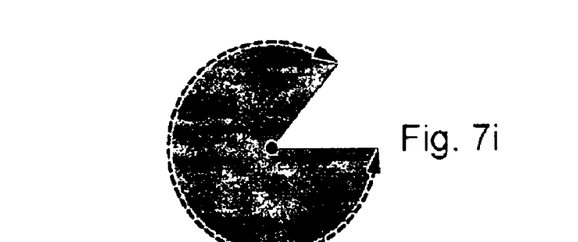

FIG. 7i shows in space the range of possible geometric orientations resulting from the addition of the various angular sectors materialized on FIG. 7h.

The possibilities for spatial orientation of the cable that is arranged on track 104b are symmetrical with those of FIG. 7h in relation to the vertical.

It will be noted that the cable winder/unwinder systems illustrated on FIGS. 6 and 7a-i can be used independently of the platform, in other applications (even outside the sphere of aviation) where a motorized drive for winding and unwinding of cables in a reduced space requirement is demanded.

Such a system with two independent paths offers an excellent capacity/complexity compromise in environments where space is lacking.

The systems of FIGS. 6 and 7a-i are synchronized in order to allow the raising and lowering of the platform in consistent manner, that is, by preventing one of the sides from being positioned higher than its opposite side during movement of the platform.

To this end, means are provided for adjusting the horizontal position, also called horizontality, of the platform in relation to a horizontal reference point of the aircraft such as floor 18 of FIG. 1.

In fact, the position of one or more parts of the platform is adjusted in terms of parallelism in relation to the floor.

The means for adjustment of the parallelism of the platform in relation to the floor comprise, for example, one or more sensors 39 able to detect the position of one or more parts of the platform in relation to the horizontal.

By way of example, four magnetic sensors can be arranged on plateau 38 and magnetic reference points (positioned at the time of installation of the system, for example in the form of a magnetic ruler) that can be read by the sensors arranged vertically on the walls forming the elevator shaft for the platform cooperate with these sensors in order to detect a possible fault in positioning.

It will be noted that the sensors monitor the position of each of the four angles of plateau 38 and provide an information item on the corresponding position of the part of the plateau concerned to a computer system that is connected to the winder/unwinder
system and, in particular, to the motor thereof in order to activate or not activate them depending on the information item or information items received.

Thus the four sensors (which can be optical or of another type) read in real time the position of each angle of the plateau on a magnetic ruler and the values read are processed in real time by a computer that controls the four motors in order to keep the plateau, and therefore the platform, constantly parallel to the floor.

It is in this way that synchronization of the various components (plateau, winders/unwinders, motors . . . ) is easily ensured.

This also makes it possible to position the platform precisely in the chosen position.

Figure 8:
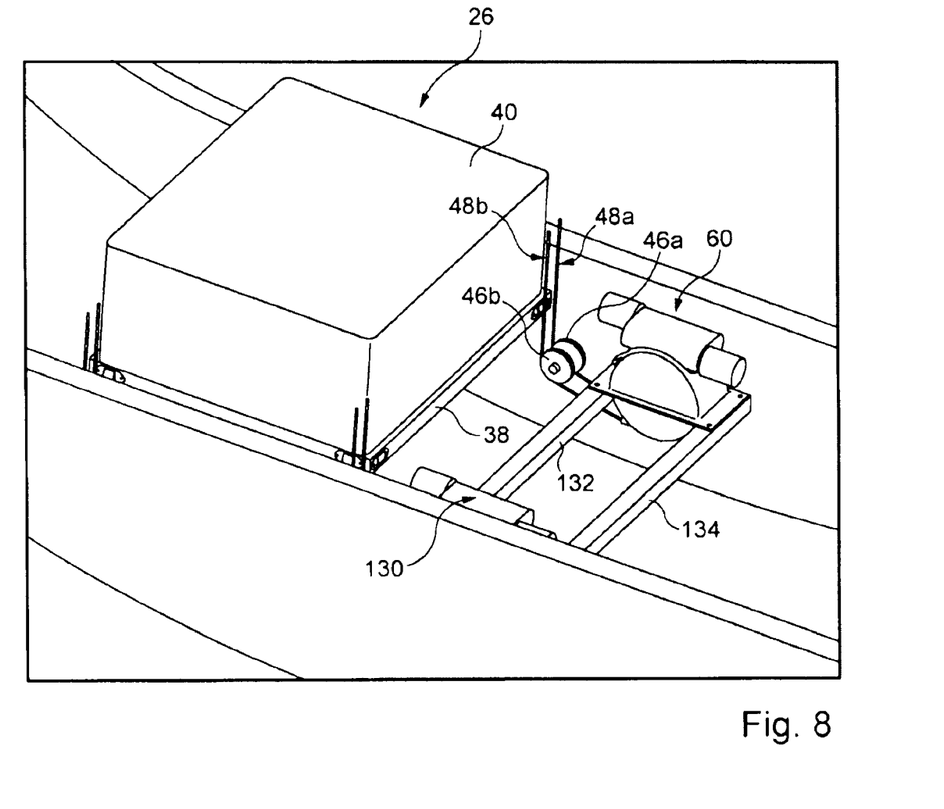

FIG. 8 illustrates the in situ setting up of two cable winder/unwinder systems such as system 60 and another system, marked 130, positioned between two transverse beams 132 and 134 by virtue of fastening elements attaching the casing (through its base plate) for each of these systems to the transverse frames.

There have been shown on this Figure platform 26 housed between two opposite walls and the first pair of lower pulleys 46*a* and 46*b* on which traction cables 48*a* and 48*b* connected to winder/unwinder system 60 are wound.

Cables 48*a* and 48*b* traverse the plateau near its peripheral edge and are fastened thereto by means of a clamping mechanism such as a cable-clamp integral with plateau 38 in its thickness.

Figure 9:
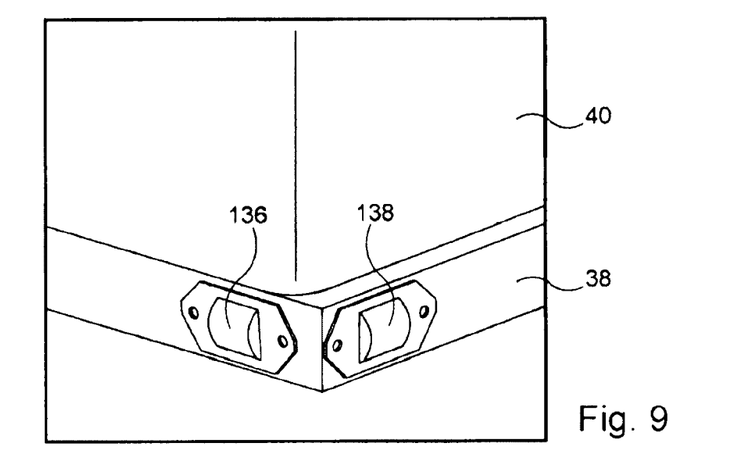
FIG. 9 shows the positioning of guide mechanisms on the platform according to the invention.

Furthermore, as shown on FIG. 9, the platform comprises a series of guide mechanisms positioned at the periphery of the said platform and which cooperate with the walls, along which the platform slides vertically, or only with some of them.

More specifically, these guide mechanisms are distributed at the periphery of plateau 38 on each of the sections thereof in contact with a wall.

For example, two guide mechanisms such as rollers mounted rotating around horizontal axes are positioned close to each of the four corners of the plateau, each on one of the two adjacent sections forming a corner.

On FIG. 9, two rollers 136, 138 are positioned in the thickness of the plateau and project slightly in relation to the section of the said plateau in which they are arranged so as to come into contact with the corresponding opposite wall.

It will be noted that the platform according to the invention can be inserted completely into a parallelepipedal or cylindrical space if need be.

In addition, the platform allows an easy movement of on-board personnel between two decks or various levels of the aircraft.

It furthermore is possible to consider the installation of a platform that would be movable vertically along more than two levels.

Moreover, the platform according to the invention can be arranged at any place in the aircraft, for example in the rear portion where rest modules are located in order to allow the on-board personnel to go to the level where such a module is situated, which level often is different from the one where the passengers are located.

It will be noted that the winder/unwinder systems and more generally, the means for driving the platform are not necessarily positioned at the first level or at the second level but can be installed between these two levels, depending on the space available in the installation area considered.

The invention claimed is:

1. An aircraft comprising at least two levels situated one above the other, comprising:
    a platform open along its entire periphery and including a top portion and a bottom portion, the top portion is fixed to the bottom portion and ends of the bottom portion extend past corresponding ends of the top portion, and the platform is movable between a first lower position and a second higher position, the first lower position being situated at a first level of the aircraft and the second higher position being situated at a second level higher than that of the first level;
    a series of traction cables connected to the ends of the bottom portion of the platform and to a drive mechanism for the cables for raising and lowering of the platform; and
    a series of walls surrounding the platform at least partially and along which the platform moves.

2. The aircraft according to claim 1, wherein the platform comprises a series of guide mechanisms distributed at its periphery and that cooperate with the series of walls along which the platform moves.

3. The aircraft according to claim 1, further comprising a floor at a level of which the platform is located in its second higher position, and an adjustment mechanism to adjust parallelism of the platform in relation to the floor.

4. The aircraft according to claim 3, wherein the adjustment mechanism comprises one or more sensors detecting the position of one or more parts of the platform and issuing a corresponding position information item in order accordingly to activate or not activate the drive mechanism for the corresponding cable or cables.

5. The aircraft according to claim 3, further comprising an access hatch attached to the floor.

6. The aircraft according to claim 3, wherein the floor at the level of which the platform is located in its second higher position includes an opening, and the top portion of the platform is movable through the opening so that a top surface of the top portion is flush with the floor, and the bottom portion of the platform is not movable through the opening.

7. The aircraft according to claim 1, wherein the series of traction cables go through a system of upper pulleys arranged at the second level and through a system of lower pulleys arranged at the first level.

8. The aircraft according to claim 7, wherein the series of upper pulleys comprises four pulleys each arranged next to one of four angles of the platform when the platform is in its second position, the series of lower pulleys comprising at least four pulleys arranged respectively at a base of the four upper pulleys.

9. The aircraft according to claim 1, further comprising at least two cable winder/unwinder systems with two independent oriented paths, each path allowing for two traction cables.

10. The aircraft according to claim 9, wherein at least one of the two cable winder/unwinder systems possesses paths having plural possible geometric orientations for the cables exiting from the system.

11. The aircraft according to claim 1, further comprising an aisle extending from a cockpit up to a door providing access to the rest of the aircraft, the platform in its first higher position emerging at the aisle.

12. An aircraft comprising at least two levels situated one above the other, comprising:
- a platform that can be moved between a first lower position and a second higher position, the first lower position being situated at a first level of the aircraft and the second higher position being situated at a second level higher than that of the first level;
- a series of traction cables connected to the platform and to a drive mechanism for the cables for raising and lowering of the platform;
- a series of walls surrounding the platform at least partially and along which the platform moves; and
- at least two cable winder/unwinder systems with two independent oriented paths, each path allowing for two traction cables, and at least one of the two cable winder/unwinder systems possesses paths having plural possible geometric orientations for the cables exiting from the system.

13. The aircraft according to claim 12, wherein the platform comprises a series of guide mechanisms distributed at its periphery and that cooperate with the series of walls along which the platform moves.

14. The aircraft according to claim 12, further comprising a floor at a level of which the platform is located in its second higher position, and an adjustment mechanism to adjust parallelism of the platform in relation to the floor.

15. The aircraft according to claim 14, wherein the adjustment mechanism comprises one or more sensors detecting the position of one or more parts of the platform and issuing a corresponding position information item in order accordingly to activate or not activate the drive mechanism for the corresponding cable or cables.

16. The aircraft according to claim 14, further comprising an access hatch attached to the floor.

17. The aircraft according to claim 12, wherein the series of traction cables go through a system of upper pulleys arranged at the second level and through a system of lower pulleys arranged at the first level.

18. The aircraft according to claim 17, wherein the series of upper pulleys comprises four pulleys each arranged next to one of four angles of the platform when the platform is in its second position, the series of lower pulleys comprising at least four pulleys arranged respectively at a base of the four upper pulleys.

19. The aircraft according to claim 12, further comprising an aisle extending from a cockpit up to a door providing access to the rest of the aircraft, the platform in its first higher position emerging at the aisle.

20. An aircraft comprising at least two levels situated one above the other, comprising:
- a platform open along its entire periphery and including a top portion and a bottom portion, the top portion is fixed to the bottom portion and ends of the bottom portion extend past corresponding ends of the top portion, and the platform is movable between a first lower position and a second higher position, the first lower position being situated at a first level of the aircraft and the second higher position being situated at a second level higher than that of the first level;
- a series of traction cables connected to the ends of the bottom portion of the platform and to means for driving the cables for raising and lowering the platform; and
- a series of walls surrounding the platform at least partially and along which the platform moves.

21. The aircraft according to claim 20, further comprising a floor at a level of which the platform is located in its second higher position, and means for adjusting parallelism of the platform in relation to the floor.

* * * * *